United States Patent [19]

Morgan, Jr.

[11] 3,822,801

[45] July 9, 1974

[54] VEHICLE RACK

[76] Inventor: William A. Morgan, Jr., 1820 N. Main Ext., Butler, Pa. 16001

[22] Filed: Nov. 17, 1972

[21] Appl. No.: 307,482

[52] U.S. Cl......... 214/450, 224/42.03 R, 224/42.08
[51] Int. Cl. .............................................. B60i 9/00
[58] Field of Search ......... 214/450, 130, 86 A, 451, 214/454, 77, 78; 224/42.03 R, 42.03 A, 42.07, 42.08, 42.44, 42.46

[56] References Cited
UNITED STATES PATENTS

| 2,338,955 | 1/1944 | Metcalf | 224/42.08 |
| 2,379,797 | 7/1945 | Gilbert | 214/130 |
| 2,411,821 | 11/1946 | Choat | 214/77 R |
| 3,586,188 | 6/1971 | Cambell | 214/450 |

Primary Examiner—Robert G. Sheridan
Assistant Examiner—John Mannix
Attorney, Agent, or Firm—Webb, Burden, Robinson & Webb

[57] ABSTRACT

A rack for loading and transporting an article, such as an animal carcass, which can be mounted on a vehicle bumper. The rack includes a tubular frame and tubular cross-members bent in a V-shape forming two sections. Adjustable flexible straps connect opposite edges of the frame sections to a bumper permitting it to be raised from a ground-contacting loading position to an article transporting position.

3 Claims, 3 Drawing Figures

VEHICLE RACK

This invention relates to a rack for supporting articles on a vehicle and more particularly, to a rack adapted for attachment to the rear bumper of an automobile for supporting and transporting an animal carcass taken while hunting.

Although there are many types of racks and supports which may be secured to an automobile bumper, none of which I am aware includes the structure and advantages of my rack. Most known racks are platform type which extend parallel to the ground and are intended to support luggage, e.g., U.S. Pat. Nos. 3,521,799 and 3,690,526; others, such as boat motor racks, are provided with novel features specific to the articles to be supported and carried, e.g., U.S. Pat. No. 2,907,483.

Recently a rectangular tubular rack has been made which is adapted for connection to the rear of an automobile. The rack is bent at an angle. Two substantially L-shaped metal clamps are pivotally mounted on one edge of the rack for attachment to an automobile bumper; a long metal rod is pivotally mounted on the opposite edge and is adapted for connection to a bolt secured in the automobile trunk. Thus, the user must deface the exterior of the car to mount the rack. Moreover, it is necessary to lift the rack and an article carried thereon in order to attach the rod to the bolt in the trunk to transport the article.

My rack comprises a substantially rectangular tubular frame. A number of spaced short tubular cross-members are secured to the frame. The frame and cross-members are bent in a generally V-shape to form two rack sections. In one embodiment a reinforcing member is secured to the outside of the angle forming the two rack sections. Adjustable flexible straps having appropriate bumper attachment means are provided for attaching one section of the frame to a vehicle bumper and for pivoting the rack from a first position for loading to a second position for transporting an animal carcass.

The rack is relatively lightweight, easily storable, and enables a person of ordinary or small size and minimum strength to raise and move a heavy animal carcass or other article. The V-shape of the rack permits it to both support and retain an article on the rack.

Rack 1 comprises a tubular frame 2. A number of short tubular cross-members 3 are secured to the frame for rigidity. The frame and cross-members, which are preferably aluminum, are bent to form a generally V-shape comprising two rack sections which extend at an angle to each other. In the preferred embodiment the angle is approximately 120° but any angle from about 90° to approximately 150° is suitable. A reinforcing member 4 may be secured to the frame and to each of the cross-members outside the angle formed by the two sections.

Figure 1:
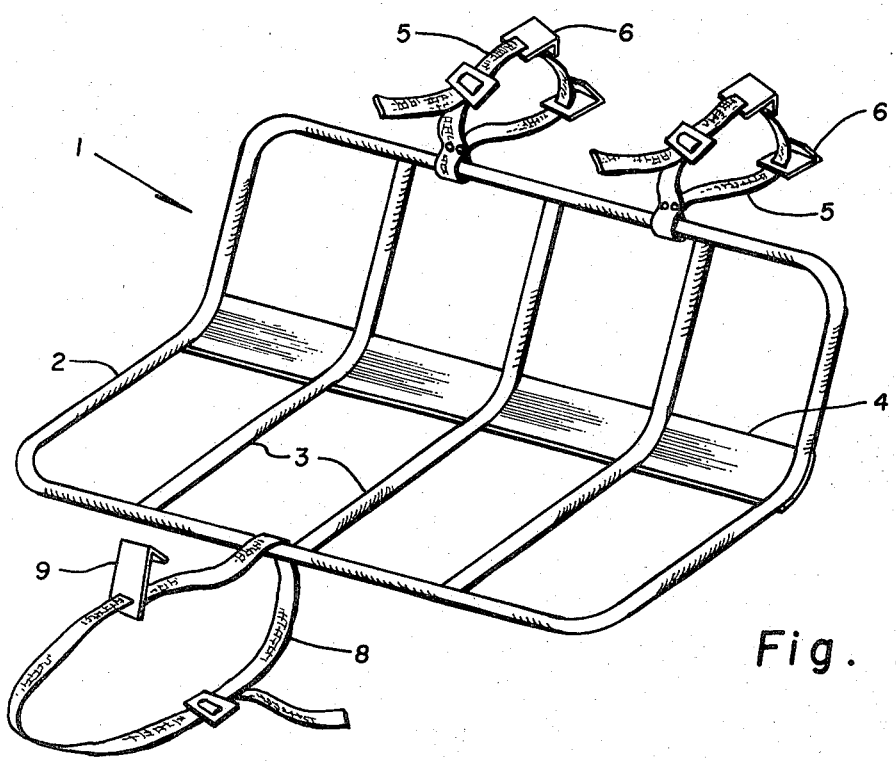
FIG. 1 is a perspective view of the rack.
Figure 2:
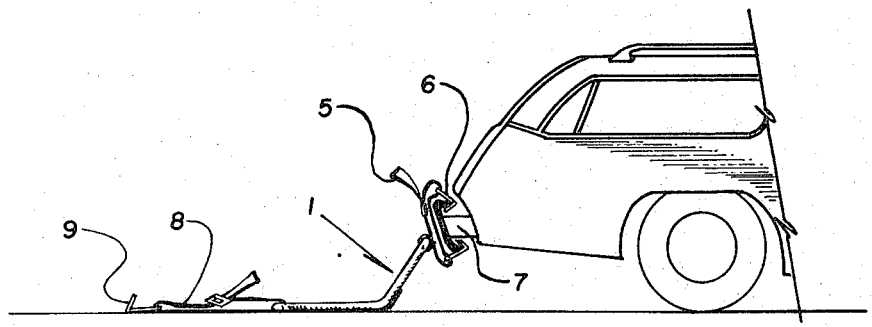
FIG. 2 is a view of the rack attached to a vehicle bumper in a first position.

Adjustable flexible straps 5 of any conventional type such as nylon webbing are connected to one edge of the frame 2. Appropriate attachment means, such as clamps 6, on each strap permit attachment to any size automobile bumper 7 (FIG. 2). Adjustable flexible strap 8 is connected to the opposite edge of the frame. It also carries conventional means, such as clamp 9, for attachment to a bumper.

Figure 3:
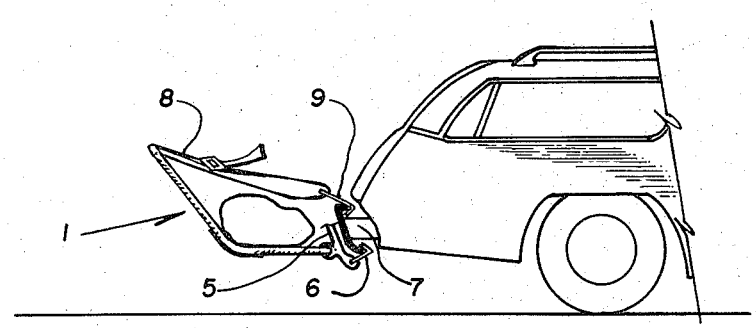
FIG. 3 is a view of the rack attached to a vehicle bumper in a second position for transporting an animal carcass or other article.

As shown in FIG. 2, the rack may be loaded by attaching it to bumper 7 by using the clamps on straps 5, so that one section of the rack rests on the ground. An animal is then placed, rolled, or pushed onto the rack. Thereafter, the strap 8 is extended over the animal and the clamp 9 is attached to the bumper. The strap is then shortened, for example by pulling on a free end thereof, to raise the section from the ground into a second position shown in FIG. 3 (wherein strap 5 is broken for clarity). As the rack is raised, it may pivot or roll upon the length of the reinforcing member 4. The strap 8 is then tied or secured in the shortened condition for transporting the animal in the rack on the vehicle.

My rack is simply constructed. It may be attached to either a front or rear vehicle bumper, without damaging the vehicle. Of course, it may be used for carrying any article, although it is especially useful for loading and transporting an animal carcass.

Having described a preferred embodiment of my invention, it may be otherwise embodied within the scope of the appended claims.

I claim:

1. An article supporting rack for attachment to the bumper of a vehicle comprising:
    A. a substantially rectangular tubular frame;
    B. a plurality of tubular cross-members connected to opposed edges of the frame, the frame and cross-members being bent in a generally V-shape to form two sections;
    C. adjustable flexible straps connected to one edge of the frame for attaching a first section to a vehicle bumper such that the other section contacts the ground in a first position for loading the article; and D. an adjustable flexible strap connected to an opposite edge of the frame for attaching the other section to the bumper and adjustable to raise it to a second position for transporting the article.

2. An article supporting rack as set forth in claim 1 in which the two sections are formed in a V-shape having an included angle of between about 90° and 150°.

3. An article supporting rack as set forth in claim 1 and having a reinforcing member secured to the frame along the cross members at the junction of the two sections.

* * * * *